United States Patent [19]

Guy

[11] 4,261,397
[45] Apr. 14, 1981

[54] FILL LEVEL CONTROL SYSTEM FOR VISCOUS, VARIABLE DENSITY FLUID PRODUCTS

[76] Inventor: Edward L. Guy, 340 NW. 50th, Seattle, Wash. 98107

[21] Appl. No.: 49,498

[22] Filed: Jun. 18, 1979

[51] Int. Cl.³ .............................................. B65B 3/26
[52] U.S. Cl. ........................................ 141/1; 141/95; 141/198; 340/618
[58] Field of Search .............................. 141/192–198, 141/94, 95, 96, 83, 82, 1–12; 307/118, 362; 340/200, 618; 62/126, 218; 73/304 R, 304 C; 137/392

[56] References Cited
U.S. PATENT DOCUMENTS 3,448,778  6/1969  Ramsay ............................... 141/198

Primary Examiner—Houston S. Bell, Jr.

[57] ABSTRACT

A system for detecting when a fluid product, which may be highly viscous and have a variable density such as milkshake, fills to a predetermined level in a container and for automatically terminating flow of the product into the container in response thereto. The system includes a capacitive proximity sensor positioned adjacent the outer wall of the container near the predetermined level. The sensor is connected in a conventional oscillator circuit which generates an oscillating signal having an amplitude and frequency which is a function of the capacitance of the sensor. When product enters the electrostatic field generated by the sensor, an electrical characteristic of the oscillating signal changes thereby causing the current drain of the sensor to increase. The current to the sensor is compared to a preset level, and the flow to the container is terminated when the preset level is exceeded.

9 Claims, 3 Drawing Figures

FILL LEVEL CONTROL SYSTEM FOR VISCOUS, VARIABLE DENSITY FLUID PRODUCTS

BACKGROUND OF THE INVENTION

1. Field of the Invention

This invention relates to dispensers for fluid products, and more particularly to a system for automatically filling a cup or container with a fluid product which may be highly viscous and which may have a density which varies in an unpredictable manner.

2. Description of the Prior Art

In restaurants, particularly of the fast food variety, it is particularly desirable to allow containers or cups to be automatically filled to predetermined levels. In this type establishment the individual serving a customer places the container beneath a dispensing outlet and manually initiates the filling of the container. Since the filling will automatically terminate at a predetermined level, the individual can then prepare the remaining portions of the customer's order while the container is being filled. Consequently, such automatic fill level systems can markedly increase the throughput capacity of such establishments.

Prior art automatic fill level dispensers typically operate in accordance with a number of separate principles. One operating principle is to merely allow the product to flow into the container for a predetermined period of time after which filling terminates. This technique is satisfactory for relatively low viscosity and constant viscosity products such as soft drinks which flow at a constant rate. However, the flow rate of highly viscous products and products having a variable viscosity such as milkshakes varies, thereby making this technique impractical.

A second technique for automatically filling a container to a predetermined level is to place the container on an automatic weighing device which terminates flow of the product to the container when the weight of the product within the container reaches a predetermined value. Once again, this technique is highly satisfactory for products having a constant density, but it is not practical for products such as milkshakes which have a variable density caused by such characteristics as the quantity of air in the product.

A third automatic filling technique utilizes optical sensors for determing when the product reaches a predetermined level in the container. Although this technique avoids problems inherent in the time duration filling technique and the weighing technique, it is usually not practical in fast food establishments since the containers are generally waxed paper cups which are somewhat opaque and which have a translucence which varies considerably.

A fourth variety of fluid level detector utilizes capacitive sensors which are either immersed in the fluid such as the systems disclosed in U.S. Pat. No. 3,746,975 issued to Alpby, U.S. Pat. No. 3,801,902 issued to Horowitz and U.S. Pat. No. 3,868,664 issued to Hill or they dispense the fluid into a specially constructed container such as the systems disclosed in U.S. Pat. No. 4,069,710 issued to Treier, U.S. Pat. No. 3,706,980 issued to Maltby and U.S. Pat. No. 4,002,996 issued to Klebanoff et al. Neither of these techniques are acceptable for use in a typical fast food establishment. When the product is milkshake, for example, the dispenser may dispense more than one flavor so that it would be necessary to clean immersible capacitance sensors after each container was filled. Furthermore, milkshake dropping from the sensor would make this approach unreasonably messy. The special container approach is also unacceptable because the containers used in a typical fast food establishment are normally discarded after use necessitating that the container be relatively inexpensive. Inexpensive containers do not have the highly controlled electrical parameters required by the special container approach.

For the reasons described above, an automatic fill level control system capable of handling such products as milkshakes is not commercially available. Consequently, even highly automated fast food establishments which utilize automatic fill level control systems for soft drinks must manually operate milkshake dispensing machines throughout the entire dispensing procedure. This results in a substantial limitation on the throughput capacity of such establishments.

SUMMARY OF THE INVENTION

It is an object of the invention to provide a system which is capable of automatically filling a container with either a highly viscous, variable viscous or variable density fluid product.

It is another object of the invention to provide a fill level control system for viscous fluid products which allows the product to be placed in ordinary, relatively inexpensive containers.

It is still another object of the invention to provide a fill level control system having the capabilities described above which is relatively simple, inexpensive and trouble-free.

It is a further object of the invention to provide a fill level control system for viscous products which does not contact the product and thus does not require cleaning during use.

These and other objects of the invention are provided by a fill level control system for a fluid product dispenser which employs a conventional capacitive proximity sensor positioned adjacent the outside wall of a container at a predetermined level. The proximity sensor generates an electrostatic field which extends into the container. Consequently, when product is filled to the predetermined level the electrostatic field passes through the product, thereby varying the capacitance of the sensor. This capacitance change is detected and utilized to terminate flow of product from the dispenser. It is important to note that the proximity sensor must be capable of detecting products having varying dielectric properties even though the product is separated from the sensor by both an air gap and a container which may also have largely varying dielectric properties. This is marked contrast to prior art techniques which either utilize special containers or sensors which are immersed in a fluid. The change in capacitance is preferably detected by utilizing the increased current drain of the sensor resulting from a change in an electrical characteristic of the oscillating signal which occurs when the electrostatic field passes through the product.

DETAILED DESCRIPTION OF THE INVENTION

Figure 1:
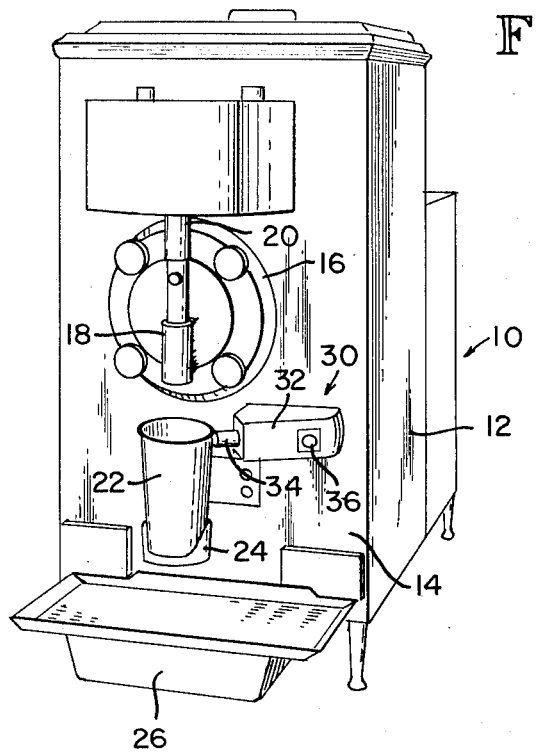
FIG. 1 is an isometric view of a fluid product dispensing machine utilizing the inventive fill level control system.

One variety of viscous fluid product dispensing machine which may advantageously use the inventive fill level control system is a milkshake dispenser 10 illustrated in FIG. 1. The dispenser includes a housing 12 in the form of a rectangular prism having a front panel 14 where the milkshake is dispensed. Commercial milkshake mixing machines 10, as illustrated in FIG. 1, utilize an elongated freezing cylinder (not shown) into which a suitable liquid is introduced. The walls of the freezing cylinder are maintained below the freezing level of the liquid so that the liquid freezes. A rotating helical dasher (not shown) carries a scraper blade (not shown) which scrapes the frozen product from the walls of the freezing cylinder while the dasher conveys the frozen product to a cylinder front plate 16 which carries a dispensing nozzle 18. Typically, the nozzle 18 is opened by lifting a handle 20 which also causes the dasher to rotate. However, many conventional milkshake dispensers, including the dispenser illustrated in FIG. 1, utilizes a solenoid to raise the handle 20 in order to dispense product.

Fill level control systems for milkshake dispensing machines cannot utilize conventional techniques because of the physical properties of the milkshake. The milkshake is highly viscous so that it does not flow from the dispenser at a constant rate. Thus time duration filling dispensers cannot be used. Even if some compensation could be made for the increased time needed to fill a container because of the high viscosity, variations in viscosity due, for example, to temperature variations would prevent the use of time duration filling techniques. The density of the milkshake also varies to some extent so that fill level control systems utilizing weighing techniques cannot be used.

A cup 22 for receiving the product is supported by a cup holder 24 which is mounted on the front panel 14 of the dispenser 10. The cup 22 used in a typical fast food establishment is of the inexpensive waxed paper variety having electrical and mechanical characteristics which vary to some extent. A catch basin 26 is also mounted on the front panel 14 beneath the cup 22 to receive any drippings from the nozzle 18 which may inadvertently occur.

Figure 2:
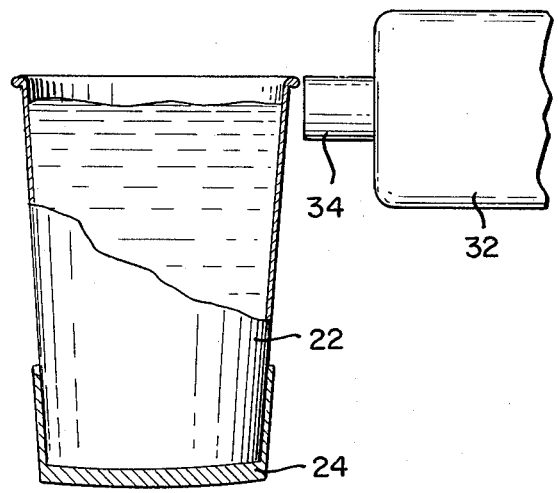
FIG. 2 is a detailed isometric view showing the relationship between the product container and the fill level detector.

A principal feature of the inventive fill level control system includes a fill level sensing unit 30 illustrated in greater detail with respect to the cup 22 in FIG. 2. The sensing unit includes a housing 32 fastened to the front panel 14 of the dispenser 10. A conventional capacitive proximity sensor 34 projects from the housing 32 to a point closely spaced from the upper side of the cup 22. The proximity sensor 34, which is available from R. B. Denison of Bedford, Ohio, includes a high frequency oscillator utilizing a capacitor, one of whose plates is built into the end of the sensor 34. When the circuit is oscillating, an electrostatic field is created around the free capacitor plate, and this field extends into the upper interior of the cup 22. When the milkshake M rises in the cup 22 to a point where it changes the capacitance of the capacitor plate sufficiently, the amplitude of the oscillator output changes. As explained hereinafter, as the output of the oscillator changes the current drain of the proximity sensor 34 increases; and this increase is utilized as an indication that the cup 22 is full. It is important to note with reference to FIG. 2 that the end of the proximity sensor 34 is spaced apart from the milkshake M by both an air gap and the thickness of the cup 22. This structure markedly departs from the teachings of the prior art in which either the capacitor proximity sensor is placed in contact with the fluid to be measured or the environment surrounding the capacitive proximity sensor is precisely controlled. In contrast, the size of the air gap between the cup 22 and the sensor 34 may vary somewhat and the thickness and electrical properties of the cup 22 may also vary. Furthermore, the density and electrical properties of the product may also vary greatly. Thus the sensing structure illustrated in FIG. 2 is a significant departure from conventional designs.

The housing 32 also carries a push button switch 36 which, as explained hereinafter, is actuated to cause the dispenser 10 to begin dispensing product P. The dispensing continues until the product P reaches a level in the cup 22 adjacent the end of the proximity sensor 34, at which time dispensing automatically terminates. Consequently, a server is able to prepare other portions of an order while the cup 22 is being filled with milkshake thereby markedly improving the throughput capacity of eating establishments.

Although the inventive fill level control system has been described chiefly in connection with a milkshake dispenser, it will be understood that it is particularly useful in any application where any fluid product is dispensed which is too viscous to utilize fixed time period dispensing devices and which has a density which varies to such an extent that weighing dispensers cannot be used. However, the inventive fill level control system will function with other fluid products which can also be dispensed with conventional fill level control systems.

Figure 3:
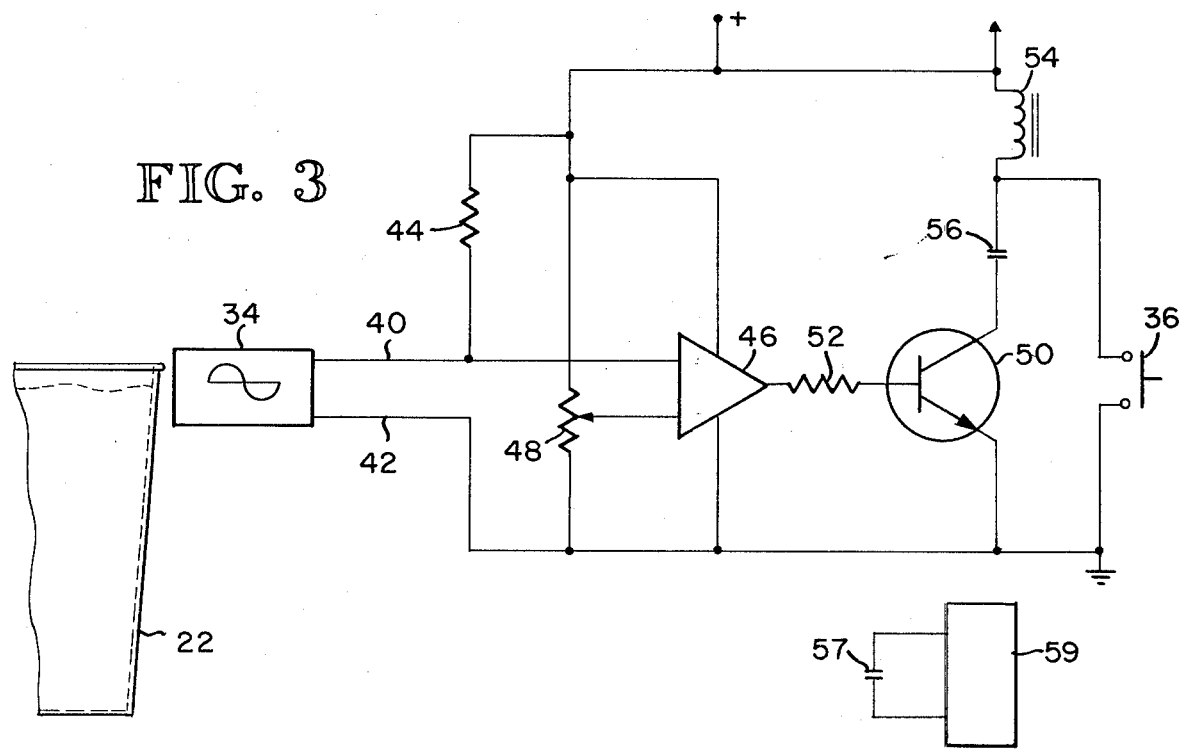
FIG. 3 is a schematic of the detection circuit for the fill level sensor.

The detection circuit which is connected to the proximity sensor 34 is illustrated in FIG. 3. The proximity sensor 34 contains a pair of leads 40, 42, one of which 42 is connected to signal ground while the other 40 is normally powered by a positive voltage. In the circuit of FIG. 3, the power line 40 is connected to a positive supply voltage through a resistor 44 so that the voltage on line 40 is inversely proportional to the current drawn by the sensor 34. The voltage on the lead 40 is applied to the noninverting terminal of an operational amplifier 46 which may be a LM 124 sold by National Semiconductor. The inverting terminal of the operational amplifier 46 is connected to the wiper of a potentiometer 48. The potentiometer 48 is connected between the supply voltage and signal ground in order to function as a voltage divider. Since the operational amplifier 46 is operated open loop, it functions as a comparator for comparing the voltage on the wiper of potentiometer 48 with the voltage on the power line 40 to the proximity switch 44. The output of the operational amplifier 46 is connected to the base of a NPN transistor 50 through a resistor 52 which prevents excessive current from flowing through the base-emitter junction of transistor 50. A series circuit consisting of a relay coil 54 and a normally opened relay contact 56 which is closed by current flowing through the coil 54 is connected between the supply voltage and the collector of transistor 50. The actuating switch 36 (FIG. 2), which is of the normally open, momentarily closed variety, is connected between the coil 54 and signal ground.

In operation the cup 22 is placed on the cup holder 24. Since the electrostatic field emanating from the proximity sensor 34 does not intersect product within the cup 22, the current drain of the sensor 34 is relatively low so that the voltage on line 40 is relatively high. Under these circumstances the wiper of potentiometer 48 is set to a voltage which is lower than the voltage on line 40 so that a positive voltage is produced at the output of operational amplifier 46. This positive voltage saturates transistor 50 through resistor 52. However, current does not flow through transistor 50 yet since the relay contact 56 is initially open. The dispensing procedure is initiated when the server closes the serve switch 36, allowing current to flow through relay coil 54. The relay coil 54 then closes relay contact 56 and a contact 57 delivering power to a controller 59 which actuates the serving solenoid to lift the handle 20 and the dasher motor (not shown) thereby causing milkshake to flow into the cup 22. Since transistor 50 is saturated and relay contact 56 is now closed, current continues to flow through the relay coil 56 when the serve switch 36 is released as the server prepares other portions of the order. When the milkshake reaches a level adjacent the sensor 34, the amplitude of the oscillation changes thereby causing the current drain of the sensor 34 to increase. This increased current drain reduces the voltage on line 40 until the voltage is lower than the voltage on the wiper of potentiometer 48 thereby causing the output of the operational amplifier 46 to fall to zero volts. Transistor 50 is then driven to cutoff thereby preventing current from flowing through the relay coil 54 and opening the relay contact 56 as well as the contact 57 actuating the contoller 59 for lifting the serving handle 20 and for powering the dasher motor (not shown). When the cup 22 is removed from the cup holder 24, the voltage levels revert to their original values. However, since the contact 56 opened when the transistor 50 was driven to cutoff, current does not flow through the relay coil 54 until the serve switch 36 is once again closed.

I claim:

1. A system for controlling the flow of a fluid product into a non-metallic container in which the electrical properties of said container may vary somewhat and the product may be highly viscous and may have a variable density, said system comprising:
   remotely actuated dispenser means having a dispensing outlet positioned above said container;
   a capacitive proximity sensor mounted adjacent the outer sidewall of said container at a predetermined level when said container is positioned beneath said dispensing means, said sensor being spaced apart from said sidewall by an air gap to provide a measurement through the side wall of said container of the presence of said product in said container adjacent said sensor while said fluid product is flowing into said container;
   detector means receiving the input of said sensor for detecting a change in the output of said sensor indicative of said product being adjacent said predetermined level and for generating a termination signal in response thereto; and
   control means for actuating said dispensing means to dispense product responsive to manual input and for deactuating said dispensing means responsive to said termination signal from said detecting means when product is adjacent said predetermined level.

2. The system of claim 1 wherein the current flowing through said proximity sensor varies when sufficient product flows into said container so that product is adjacent said predetermined level and said detector means senses said variation in current.

3. The system of claim 2 wherein said detector means includes a resistor positioned between a power terminal of said proximity sensor and a constant voltage node such that the voltage on said power terminal varies as a function of the current through said proximity sensor, and comparator means for comparing the voltage on said power terminal to a reference voltage.

4. The system of claim 3 wherein said reference voltage is manually adjustable to compensate for gross variations in the electrical characteristics of structure surrounding said proximity sensor.

5. The system of claim 3 wherein said control means includes a semiconductor switch having a control terminal receiving the output of said comparator means, a relay coil and a normally open relay contact controlled by said relay coil connected to form a series electrical circuit with said semiconductor switch, and a normally opened, manually closed switch connected to form a series electrical circuit with said relay coil, said relay coil further controlling the operation of a relay contact actuating said dispensing means such that closing said normally opened, manually closed switch allows current to flow through said relay coil thereby closing said normally opened relay contact and allowing current to flow through said relay coil, normally opened contact and semiconductor switch until the output of said comparator means is of the opposite polarity thereby terminating flow of current through said relay coil.

6. A method of sensing when the flow of a fluid product has reached a predetermined level in a non-metallic container in which the electrical characteristics of said container may vary somewhat and in which said product may be highly viscous and have a variable density, said method comprising detecting the stray capacitance adjacent the outer side wall of said container at a predetermined level while said fluid product flows into said container and detecting when said stray capacitance varies to a predetermined degree responsive to product filling said vessel to a level adjacent said predetermined level.

7. The method of claim 6 wherein said stray capacitanceis measured by a capacitative proximity sensor mounted adjacent the outer sidewall of said container at said predetermined level with said sensor being spaced apart from said side wall by an air gap.

8. The method of claim 7 wherein the current flowing through said proximity sensor varies when product reaches a level adjacent said predetermined level, said method further including the step of sensing variations in current through said proximity sensor.

9. The method of claim 8 wherein said current is compared to an adjustable reference level.

* * * * *